United States Patent

Yoshida et al.

[11] Patent Number: 6,141,439
[45] Date of Patent: Oct. 31, 2000

[54] APPARATUS FOR IMAGE MEASUREMENT

[75] Inventors: Takumi Yoshida; Nobuo Kochi, both of Tokyo; Masumori Chida, Toyama; Tadayuki Ito, Tokyo, all of Japan

[73] Assignee: Kabushiki Kaisha Topcon, Tokyo, Japan

[21] Appl. No.: 09/082,189

[22] Filed: May 21, 1998

[30]     Foreign Application Priority Data

May 22, 1997 [JP] Japan ................................. 9-147064

[51] Int. Cl.⁷ .............................. G06K 9/00; G06K 9/32
[52] U.S. Cl. ...................... 382/154; 382/209; 382/278; 382/294; 382/298
[58] Field of Search .................................. 382/278, 205, 382/294, 298, 299, 154, 209; 348/580; 364/731; 395/133; 358/451

[56]             References Cited

U.S. PATENT DOCUMENTS 3,638,188   1/1972   Pincoffs et al. ......................... 382/225
5,519,485   5/1996   Ohtani et al. .............................. 356/2

*Primary Examiner*—Bhavesh Mehta
*Attorney, Agent, or Firm*—Foley & Lardner

[57]             ABSTRACT

An apparatus for image measurement comprises a data setting portion for taking up one of a pair of stereoscopic images as a reference image and the other as a searched image and establishing a reference data block in the reference image and a searched data block in the searched image, a correspondence determining portion for determining correspondence between the reference data block and the searched data block, a data magnification changing portion for changing the magnification of image of the data in the reference data block according to the magnification of image of searched data in the searched image, and an image measuring portion for performing image measurement according to the output of the correspondence determining portion. The correspondence determining portion determines the correspondence by using the reference data block, of which the magnification of data has been changed in the magnification changing portion, and the searched data block.

20 Claims, 6 Drawing Sheets

(A)  (B)

(A)  (B)

(A)  (B)

APPARATUS FOR IMAGE MEASUREMENT

TECHNICAL FIELD

The invention relates to an apparatus using a plurality of images for measuring stereoscopic images.

PRIOR ART

When points corresponding to each other are searched for in a set of images by an apparatus using a plurality of digital images for measuring stereoscopic images, it is practiced to calculate the correlation coefficient between a data block including a fixed point in a reference image and a movable data block in a searched image by using a computer and determine the point corresponding to the reference point according to the strength of the correlation.

In the method of calculating correlation coefficients between images, however, failures in the correlation occurred sometimes due to difference in characteristics between photographed images. In such case, it was required to obtain the corresponding point manually by using the mouse of the computer or the like and, therefore, it took much labor and time.

We made earnest studies to find out the reason why the finding correlation fails in the method to calculate correlation coefficients. As the result, it has come to our attention that, in one set of images taken from different camera positions in different angles, local magnifications of a subject in the image are different between the images.

Namely, in the prior art, the difference in local magnifications between images of a subject taken in different angles was one of the reasons why inaccurate matching occurred in the correlation method.

This point will be described below in concrete terms. Let us consider a case where, in taking stereoscopic photographs, a subject 40 having a slanted plane 41 as shown in FIG. 1 is photographed. In this example, the stereoscopic photographs are two images with one at the left and the other at the right. In the past, in detecting, in the image at the right, a point corresponding to a fixed point M on the plane 41 in the image at the left, some data around the fixed point M were cut out from the images into data blocks of the same sizes on the left-hand side and right-hand side to be compared with each other.

In the images at the left and right, as shown in FIG. 3(A) and FIG. 3(B), the same plane 41 is photographed such that they have different widths. Thus, when it was tried to detect the corresponding points by the correlation method, it was difficult to obtain the correlation between the images because, even if they were images of the same one point, the horizontal magnifications of the textures in the images at the left and right were different.

More specifically, as shown in FIG. 4, the corresponding portions on the same plane 41 of the subject, are photographed so as to have a length L1 in the image at the left (A) and a length L2 at the right (B). Since the same subject is photographed in the ratio of L1:L2 in the images at the left (A) and right (B), the width of a pattern in the vicinity of the point M in the image at the right is L2/L1 times that in the image at the left. Therefore, when both the images were compared through calculation of the data correlation coefficient, the correlation coefficient was calculated at a low value even if the data were originally of the same point.

SUMMARY OF THE INVENTION

It is an object of the invention to improve the probability of success in the correlation calculating method by changing the magnification of the data such that the magnifications of a subject mapped on the corresponding data blocks may become virtually equal to each other before finding correlation between the data blocks.

An apparatus for image measurement according to the invention comprises a data setting portion for taking up one of a pair of stereoscopic images as a reference image and the other as a searched image and establishing a reference data block in the reference image and a searched data block in the searched image, a correspondence determining portion for determining correspondence between the reference data block and the searched data block, a data magnification changing portion for changing the magnification of image of the data in the reference data block according to the magnification of image of searched data in the searched image, and an image measuring portion for performing image measurement according to the output of the correspondence determining portion. The correspondence determining portion determines the correspondence by using the reference data block, of which the magnification of data has been changed in the magnification changing portion, and the searched data block.

Another apparatus for image measurement according to the invention rev comprises a data setting portion for taking up one of a pair of stereoscopic images as a reference image and the other as a searched image and establishing a reference data block in the reference image and a searched data block in the searched image, a correspondence determining portion for determining correspondence between the reference data block and the searched data block, a data magnification changing portion for changing the magnification of image in the searched data block according to the magnification of image of reference data in the reference image so that both the magnifications may become virtually equal, and an image measuring portion for performing image measurement according to the output of the correspondence determining portion. The correspondence determining portion determines the correspondence by using the reference data block and the searched data block, of which the magnification of data has been changed in the magnification changing portion.

Another preferred apparatus for image measurement according to the invention comprises a data setting portion for taking up one of a pair of stereoscopic images as a reference image and the other as a searched image and establishing a reference data block in the reference image and a searched data block in the searched image, a correspondence determining portion for determining correspondence between the reference data block and the searched data block, a data magnification changing portion for changing the magnification of image of the data in the reference data block according to the magnification of image of searched data in the searched image, and an image measuring portion for performing image measurement according to the output of the correspondence determining portion. The correspondence determining portion determines the correspondence by using the reference data block, of which the magnification of data has been changed in the magnification changing portion, and the searched data block.

The stereoscopic images are previously provided with indexes indicative of relative positions, and the apparatus can further comprise a data magnification determining portion for determining the magnification of the searched data block according to the position of a reference point in the searched image.

The data setting means can be adapted to establish the searched data block movable in the searched area.

The image measuring portion can be adapted, in performing the image measurement, to correct the coordinate value of the reference data changed in the magnification changing portion to the coordinate value before the changing.

Another preferred apparatus for image measurement according to the invention comprises a data setting portion for taking up one of a pair of stereoscopic images as a reference image and the other as a searched image and establishing a reference data block in the reference image and a searched data block in the searched image, a correspondence determining portion for determining correspondence between the reference data block and the searched data block, a data magnification changing portion for changing the magnification of image in the searched data block according to the magnification of image of reference data in the reference image so that both the magnifications may become virtually equal, and an image measuring portion for performing image measurement according to the output of the correspondence determining portion. The correspondence determining portion determines the correspondence by using the reference data block and the searched data block, of which the magnification of data has been changed in the magnification changing portion.

The stereoscopic images are previously provided with indexes indicative of relative positions, and the apparatus can further comprise a data magnification determining portion for determining the magnification of the reference data block according to the position of a reference point in the searched image.

The data setting means can be adapted to establish the searched data block movable in the searched area.

The image measuring portion can be adapted, in performing the image measurement, to correct the coordinate value of the searched data changed in the magnification changing portion to the coordinate value before the changing.

The correspondence determining portion is adapted to perform template matching or correlation processing.

DESCRIPTION OF THE PREFERRED EMBODIMENTS

Embodiment 1
(the case where the reference data is corrected)

In this example, it is assumed that two stereoscopic images on the left and right sides are used and changing magnification is carried out only in the horizontal direction. Because view points of cameras for two stereoscopic images are set along the horizontal direction.

Figure 1:
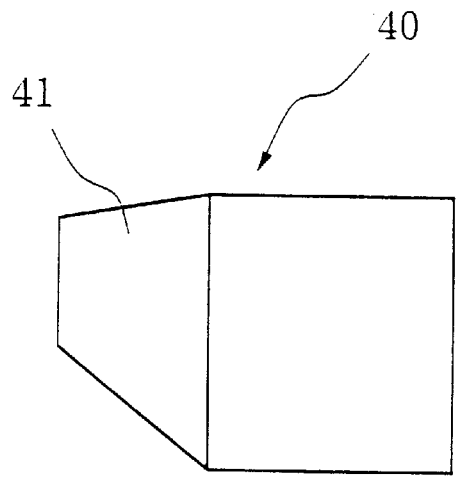
FIG. 1 is a drawing showing a body used as a subject of photographing in an embodiment of the invention.
Figure 2:
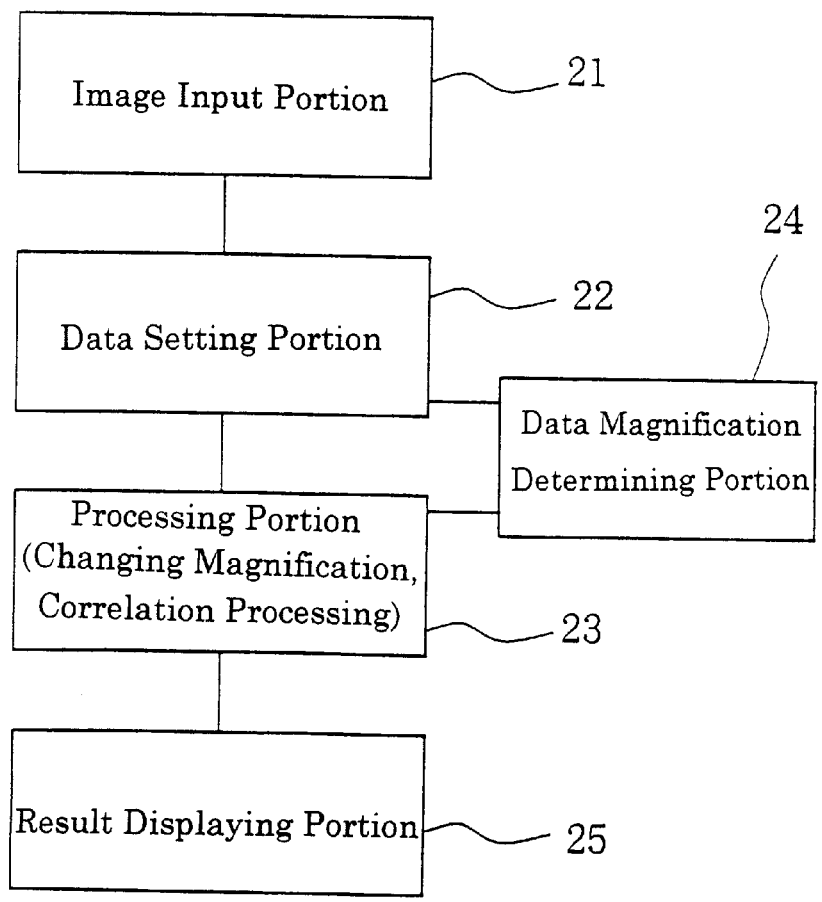
FIG. 2 is a block diagram conceptually showing an apparatus for image measurement of the invention.
Figure 3:
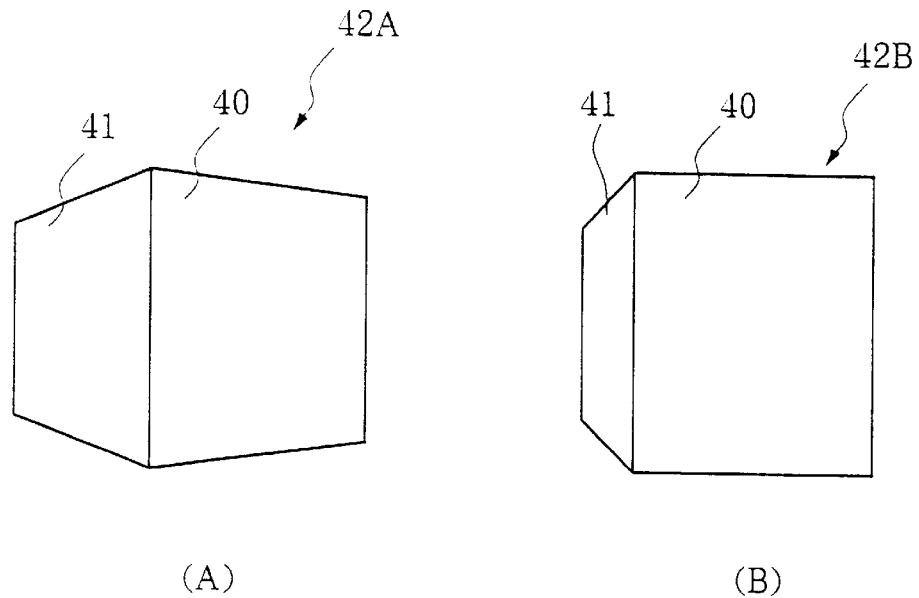
FIG. 3 show drawings of images obtained by stereoscopically photographing the subject shown in FIG. 1, of which part (A) shows an image at the left and part (B) shows an image at the right.

FIG. 2 is a block diagram showing an outline of the whole of the apparatus for image measurement. In the following description, only a data setting portion 22 and a processing portion 23 in the block diagram of FIG. 2 will be taken up. The remaining portions of the apparatus can be constructed the same as in conventional apparatus.

FORMATION OF IMAGES INCLUDING INDEXES

Figure 5:
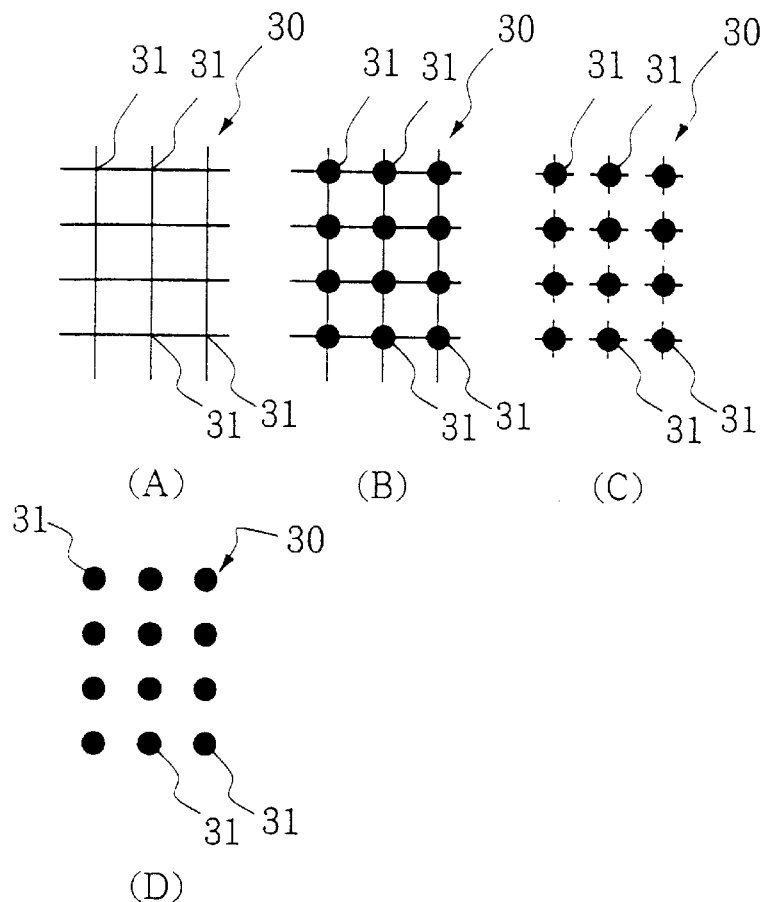
FIG. 5 is a plan view showing the pattern.

First, using an index plate as shown in FIG. 5, a pattern is projected on the subject with the use of a projector or the like and stereoscopic photographing is carried out. In the index plate, the lattice points 31 serve as void portions to allow light pass therethrough and the remaining portion serves as the light shielding portion. FIG. 5 shows part of the pattern of the index plate. The whole of the index plate is formed of a continuous development of such a pattern including, for example, 64×48 circles.

DETERMINATION OF OBJECTIVE IMAGE

Out of a set of stereoscopic images obtained by photographing a subject with the pattern projected thereon, one image serving as a reference is picked out. In the present example, the image at the left 43A is set as the reference image. Then, such a point M that a point corresponding thereto is to be searched out is considered in the reference image 43A. It is the object, in the present example, to search out the position of the point M in the other corresponding image, i.e., the image at the right 43B. As the stereoscopic images, that made up of 3072×2048 pixels can be used but other ones may also be used.

Out of the lattice points 31 mapped onto the image 43A, two lattice points 31a and 31b arranged side by side and closest to the point M considered above are taken up. The distance between them is measured and, thus, the local length in the vicinity of the considered point M in the image is set to L1. Since the magnification is changed only in the horizontal direction in this example, such lattice points 31a and 31b arranged side by side are employed. Although the length L1 varies depending on the manner of photographing or the projected lattice, the pattern projection is made such that the length L1, as the local length in the vicinity of the point M, becomes narrower than the block size of the reference data.

Figure 6:
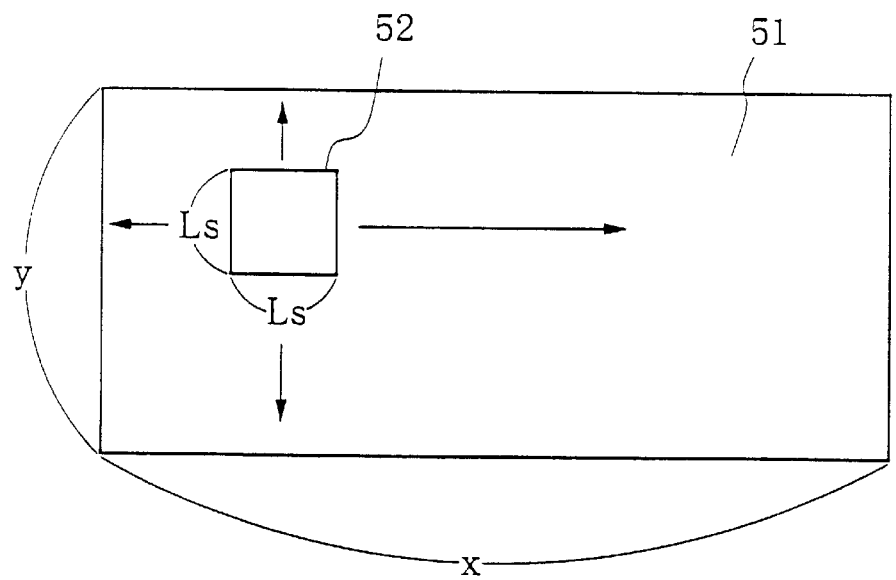
FIG. 6 is an explanatory drawing showing a searched image and a data block.
Figure 7:
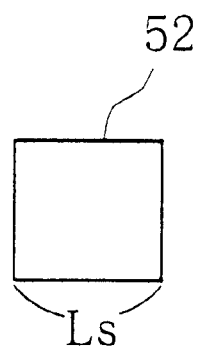
FIG. 7 is a drawing showing correction of magnification a data block.
Figure 7:
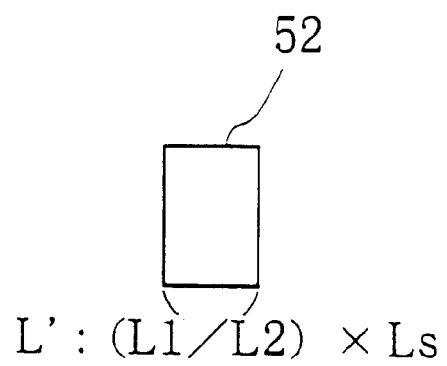

The other image pairing up with the reference image 43A is called a searched image 43B. A searched area 51 of a suitable size is established in the searched image 43B and a small data block 52 having a fixed area and being movable in the searched area 51 is considered. An example of the searched area 51 and the data block 52 is shown in FIG. 6. The searched data block is normally a square formed of odd number×odd number. The lateral side Ls of the searched data block 52 is set, for example, to 9, 25, 49 and 81. The size of the block 52 is varied depending on the coarseness of the texture of the reference image.

The subject mapped on the reference image 43A appears at changed positions on the searched image 43B depending on the length of the base line and the parallax between both the images. As to the suitable size of the searched area. 51, it is preferred that the same covers at least the range in which the subject mapped on the reference image appears on the searched image 43B. As the searched area (x×y), when the block size is 49×49, any of the sizes 128×256, 100×200, and 64×128, for example, may be employed. When a size of 125×256 is provided, for example, what is taken in the image can substantially be seen. Thus, the searched area is formed so as to have the lateral side x larger than the longitudinal side y and have a large r area than the block size (Ls×Ls).

Here, when too large a searched area 51 is taken, the time required for the correlation processing becomes longer accordingly.

CORRECTION OF MAGNIFICATION

The correction of magnification utilizes such processing as to change, in accordance with the distances between the lattice points mapped on the images, the magnification of the data in the vicinity of the reference point so that it becomes virtually equal to the magnification of the searched data.

The following procedure is carried out with the searched data block successively shifted one pixel, for example, at a time.

Taking up two projected lattice points 31c and 31d closest to the center of the searched data block, the local length of this data block is measured and it is set to L2. The magnification of the data in the vicinity of the point M in the reference image is changed by employing the length L2 and the earlier obtained length L1.

Figure 4:
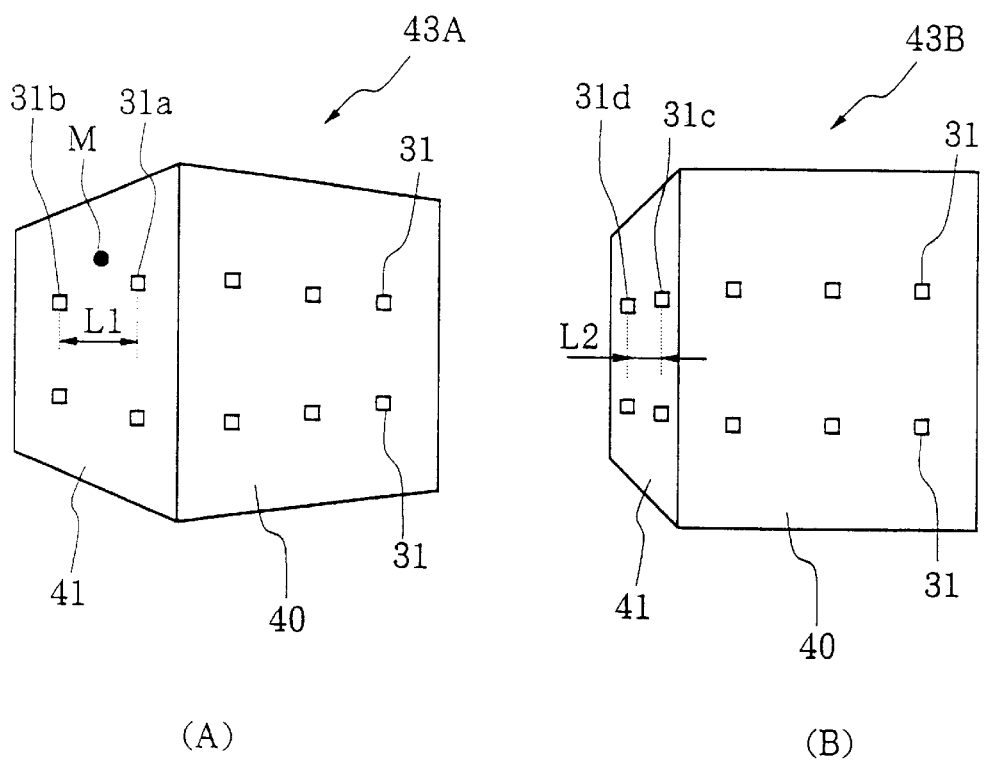
FIG. 4 show drawings of images obtained by stereoscopically photographing the subject with a pattern projected thereon, of which part (A) shows an image at the left and part (B) shows an image at the right.

By the change of the magnification, the magnification of the data in the vicinity of the reference point can be changed to become virtually equal to the magnification of the searched data. For example, in FIG. 4, the data in the vicinity of the point M in the reference image is contracted by a factor of (L2/L1). At the time of changing the magnification, the density value at a pixel position is obtained by an interpolating method. At this time, the size of the established data domain at the reference point (called, here, the reference data block) is set so as to be substantially equal to the size of the searched data block. To achieve this, using the width Ls of the searched data block, data having a width of L'=(L1/L2)×Ls is taken up with the point M in the center and the data is contracted or magnified by being multiplied by a factor of (L2/L1) with the point M or an arbitrary point in the center. Thus, it is attained to allow the data, with the magnification changed, to have the width Ls the same as the width of the searched data.

CORRELATION PROCESSING

The correlation processing is a kind of template matching comparing two images with each other for finding out correspondence.

An areal correlation coefficient of the above produced reference data block with the considered searched data block is sought.

Considering the above as one set of processes, similar sets of processes are repeatedly carried out with the searched data block shifted within the searched area. As a matter of course, the magnification of the reference data is changed each time. When the calculation has been finished for all of the pixels of the searched data block in the searched area, the searched data block having the highest correlation is searched for. Since the reference data block is established with the point M in the center, the center of the searched data block having the highest areal correlation is obtained as the wanted corresponding point.

When the detection of the projected lattice point turned out a failure in this example, the factor for changing magnification is set to unity. Further, the distance between the projected lattice points is adjusted to be a half or so of the size of the reference data block.

The actual flow of processes will be described according to the flowchart of FIG. 8 and the block diagram of FIG. 2. For the sake of simplicity, the procedure for seeking the point corresponding to one point in the reference image only will be described below. In reality, however, similar processes are repeatedly performed for each of the necessary points within the plane with which matching is desired.

Figure 8:
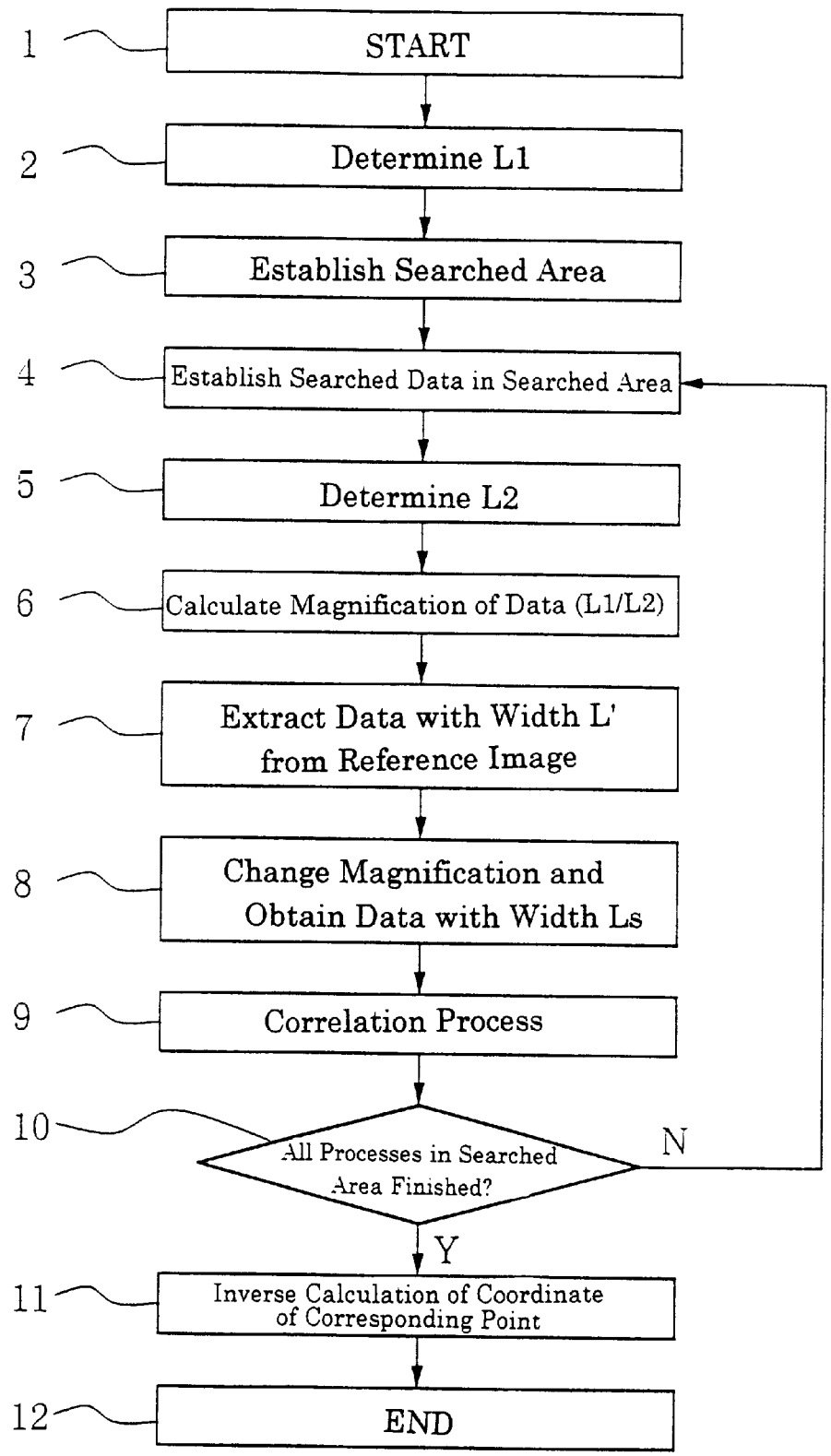
FIG. 8 is a flowchart showing a flow of processes in an embodiment 1.

With reference to the flowchart of FIG. 8, the flow is started at step 1. At step 2, the local length L1 in the vicinity of the point as the object of searching is determined. The step corresponds to the data magnification determining portion 24 in the block diagram of FIG. 2. At step 3, the searched area is established within the searched image. At step 4, a searched data block is established within the searched area. The processes at steps 3 and 4 correspond to the data setting portion 22 of the block diagram of FIG. 2. At step 5, the local length L2 of the searched data block is determined. And a parameter of magnification B (L2/L1) of the reference data block is obtained. The process corresponds to the data magnification determining portion 24 in the block diagram of FIG. 2. At step 6, the parameter B of magnification is determined with the use of the lengths L1 and L2 obtained at step 2 and step 5; at step 7, the data with a width of L' is sliced off the reference image; and, at step 8, the magnification is changed with the use of the parameter B to obtain a reference data block. At step 9, an areal correlation coefficient between the reference data block obtained at step 8 and the searched data block established at step 4 is calculated and recorded. The processes at steps 6, 7, 8, and 9 correspond to the processing portion 23 in the block diagram of FIG. 2. At step 10, it is determined whether the correlation processes for all the necessary points in the searched area have been finished. If they are finished, the flow advances to step 11. Otherwise, it returns to step 4. At step 11, the point at which the correlation is strongest is detected and its coordinate is obtained.

After the processes within the searched area have all been finished, the searched data with the highest correlation coefficient is detected. When the magnification of the data in the reference image was multiplied by B with the left-hand end of the data taken as the reference, then, in order to correctly obtain the coordinate of the corresponding point in accordance with the coordinate system on the original reference image, it must be converted to the original coordinate value by having it multiplied by the factor 1/B with the left-hand end of the reference image taken as the reference.

However, when the data of the reference data block was contracted or magnified with the point M in the center taken as the reference, the corresponding point to the reference point in the reference image is the center of the data block in the searched image and, therefore, the coordinate can be used as it is. Thus, the inverse operation for the coordinate of the corresponding point can be omitted.

Through the above described procedure, the parallax can be accurately obtained and, by known calculation based on the accurate parallax, the shape and coordinate of the subject can be obtained with precision.

When the detection of the projected lattice point turned out a failure, the factor for changing magnification is set to unity.

The flow is ended at step 12.

Embodiment 2

(the case where the searched data is corrected)

Also in this case, it is assumed that the two stereoscopic images at the left and right are used and the magnification is changed only in the horizontal direction. Because view of points of camera for two stereoscopic images are set along the horizontal direction. The lattice pattern 30 shown in FIG. 5(D) is projected on the subject. The block diagram of the whole of the apparatus is shown in FIG. 2 as with the embodiment 1.

FORMATION OF IMAGES INCLUDING INDEXES

Of the stereoscopic images, that on the left-hand side is set as the reference image 43A. The point M as the object of searching is considered in the reference image 43A. Of the lattice points mapped on the image, two points 31a and 31b located closest to the point M are taken up and the distance L1 between them is measured. Further, a set of reference data of a predetermined size is established with the point M in the center. The set of the reference data differs in size depending on the texture of the subject and is normally formed in a square of odd number×odd number.

The searched area wider than the set of the reference data is established in the searched image 43B. The movable searched data block is established in the searched area.

CORRECTION OF MAGNIFICATION

The correction of magnification is such processing as to change, in accordance with the distances between the lattice points mapped on the images, the magnification of the data of the searched data block so that it becomes virtually equal to the magnification of the reference data. For example, in FIG. 4, the data of the searched data block is magnified or enlarged by a factor of (L1/L2).

The following processes are carried out for each of the data blocks successively defined in the searched area. The local length L2 is obtained from the distance between the projected lattice points in the vicinity of the center of the searched data block. By employing this length L2 and the earlier obtained length L1, the magnification of the data of the searched data block is changed so that it is made virtually equal to that of the reference data. At this time, the changing magnification is carried out with, for example, the position of one end of the searched data block fixed. In this example, the left-hand end of the data block is fixed. In order that the size of the searched data block after the magnification changing becomes equal to the size of the reference data block, the width of the data before the magnification changing is extended rightward by (L2/L1−1)×Lt, where Lt is the width of the reference data block. As a consequence, the data length after the change of magnification is made equal to the width Lt of the reference data block. The factor B for changing the magnification used here is recorded to be used in obtaining the coordinate of the corresponding point.

CORRELATION PROCESSING

The areal correlation coefficient between the above established searched data block and the reference data block is obtained and recorded.

The above described processes are repeatedly performed with the searched data block shifted within the searched area.

Figure 9:
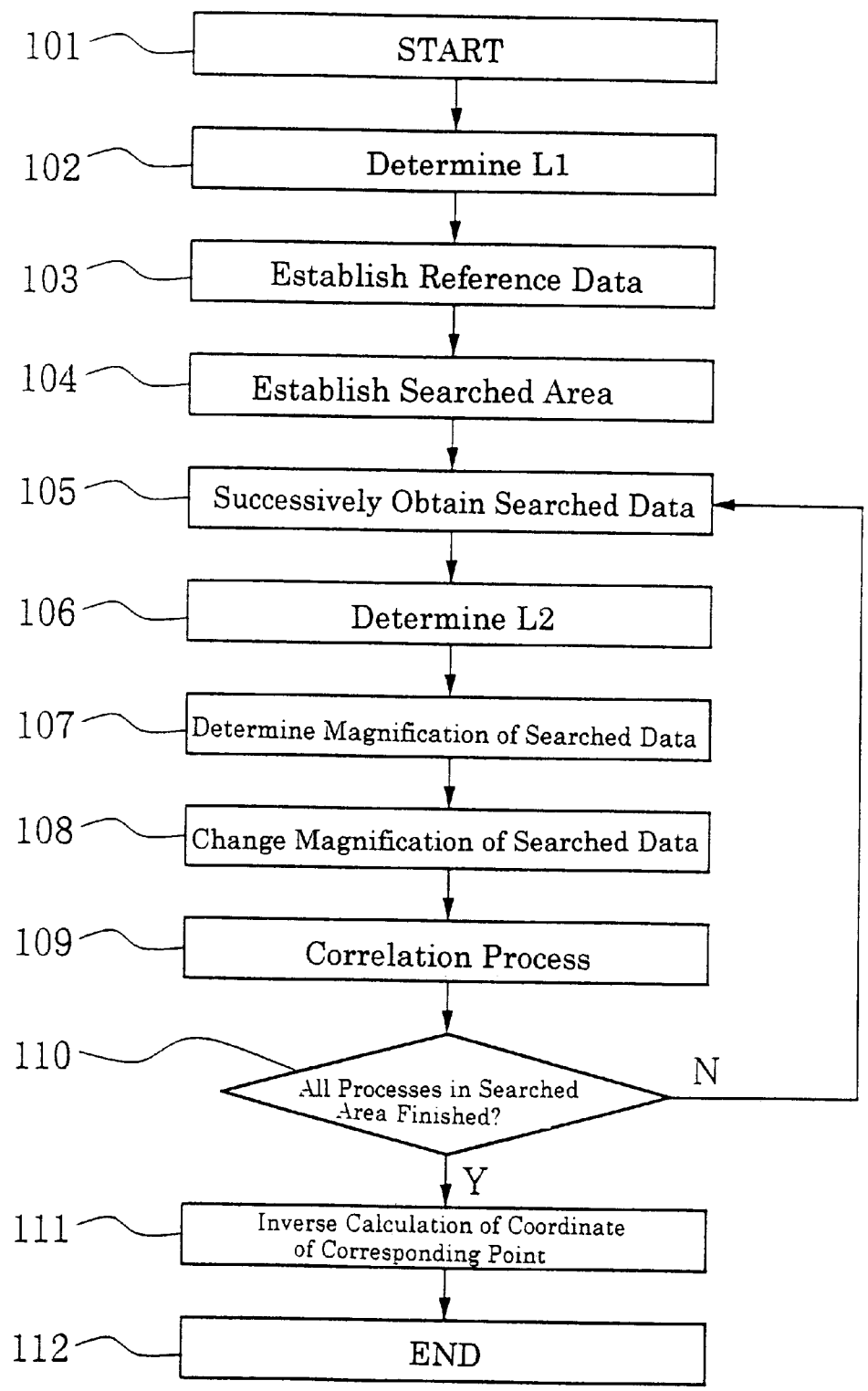
FIG. 9 is a flowchart showing a flow of processes in an embodiment 2.

The actual flow of processes will be described according to the flowchart of FIG. 9 and the block diagram of FIG. 2. For the sake of simplicity, the procedure for seeking the point corresponding to one point in the reference image only will be described below. In reality, however, similar procedure is repeated for all of the necessary points within the plane matching therewith is desired.

At step 101, the flow is started. At step 102, the local length L1 in the vicinity of the reference point is determined. The step corresponds to the data magnification determining portion 24 in the block diagram of FIG. 2. At step 103, the reference data block is obtained. At step 104, the searched area is established in the searched image. At step 105, a searched data block is obtained in the searched area. The processes at steps 103 to 105 are performed in the data setting portion 22 of the block diagram of FIG. 2. At step 106, the local length L2 is determined and, at step 107, a parameter of magnification B (L1/L2) of the searched data is obtained. The process is performed in the data magnification determining portion 24 in the block diagram of FIG. 2. At step 108, the magnification of data in the searched area is changed with the use of the parameter B for magnification obtained at step 102 and step 107. At step 109, the areal correlation coefficient between the reference data block obtained at step 103 and the searched data block produced at step 108 is calculated and recorded. The processes at steps 107, 108, and 109 are performed in the processing portion 23 in the block diagram of FIG. 2. At step 110, it is determined whether the correlation processes for all of the necessary points in the searched area have been finished. If they are finished, the flow advances to step 111. Otherwise, it returns to step 105. At step 111, the point at which the correlation is highest is picked out and its coordinate is calculated back.

After the processes within the searched area have all been finished, the searched data with the highest correlation coefficient is detected. When the magnification of the data in the reference image was changed by being multiplied by B, then, in order to correctly obtain the coordinate of the corresponding point in accordance with the coordinate system on the original searched image, it is required to convert the same into the original coordinate value by multiplying it by the factor 1/B.

However, when the data of the searched data block was contracted or magnified with its center taken as the reference, the inverse operation for the coordinate of the corresponding point can be omitted.

Thus, the parallax can be accurately obtained and, by known calculation based on the accurate parallax, the shape and coordinate of the subject can be obtained with precision.

The flow is ended at step 112.

Variations of the invention will be briefly described below.

VARIATION 1

In the above embodiments 1 and 2, the local lengths L1 and L2 may be obtained by employing a target serving as the index glued onto the subject instead of projecting the lattice points.

VARIATION 2

In the case of the embodiment 2, it is possible to make the matching after changing the magnification of the searched area as a whole assuming that the local magnification is constant throughout the searched area.

VARIATION 3

In the above embodiments 1 and 2 and variations 1 and 2, three or more stereoscopic photographs may be used for image measurement.

VARIATION 4

In the above embodiments 1 and 2, the magnification of the data block may be performed not only in the lateral direction but also in the longitudinal direction.

According to the invention, the difficulty in the matching between the left and right images of stereoscopic photographs due to the parallax can be overcome. It is when the length of the base line in photographing is large that the local magnification of a subject between a plurality of picture images comes into question. By the easiness of matching enhanced by the invention, it becomes possible to take a large base line length at the time of photographing. By the increase in the base line length, the accuracy in measurement of z coordinate in the stereoscopic measurement can be improved.

The following effects can be obtained from the invention.

According to the invention, the left and right picture images of stereoscopic photographs can be compared as images with substantially the same magnification and, hence, the accuracy in the matching can be improved.

Further, according to the invention, it becomes possible to measure images even if they are obtained with a large base line length and, hence, the accuracy in the measurement of z coordinate in stereoscopic measurement can be improved.

What is claimed is:

1. An apparatus for image measurement comprising:
   a data setting portion for taking up one of a pair of stereoscopic images as a reference image and the other as a searched image and establishing a reference data block having a first magnification in said reference image and a searched data block having a second magnification in said searched image, wherein the pair of the stereoscopic images are taken in different angles;
   a correspondence determining portion for determining correspondence between said reference data block and said searched data block;
   a data magnification changing portion for changing the first magnification of image of the data in said reference data block according to the second magnification of image of the data in said searched data block when there is a difference between the first and second magnifications whereby the first and second magnifications become virtually equal; and
   an image measuring portion for performing image measurement according to an output of said correspondence determining portion;
   wherein said correspondence determining portion determines the correspondence by using said reference data block, of which the first magnification of image of the data is changed in said magnification changing portion, and said searched data block.

2. An apparatus for image measurement according to claim 1, wherein said stereoscopic images are previously provided with indexes indicative of relative positions, further comprising a data magnification determining portion for determining the second magnification of said searched data block according to a position of a reference point in the searched image.

3. An apparatus for image measurement according to claim 1, wherein said data setting means is adapted to establish the searched data block movable in said searched area.

4. An apparatus for image measurement according to claim 1, wherein said image measuring portion, in performing the image measurement, corrects the coordinate value of said reference data changed in said magnification changing portion to the coordinate value before the changing.

5. An apparatus for image measurement comprising:
   a data setting portion for taking up one of a pair of stereoscopic images as a reference image and the other as a searched image and establishing a reference data block having a first magnification in said reference image and a searched data block having a second magnification in said searched image, wherein the pair of the stereoscopic images are taken in different angles;
   a correspondence determining portion for determining correspondence between said reference data block and said searched data block;
   a data magnification changing portion for changing the second magnification of image in said searched data block according to the first magnification of image of the data in said reference data block when there is a difference between the first and second magnifications whereby the first and second magnifications become virtually equal; and
   an image measuring portion for performing image measurement according to an output of said correspondence determining portion;
   wherein said correspondence determining portion determines the correspondence by using said reference data block and said searched data block, of which the second magnification is changed in said magnification changing portion.

6. An apparatus for image measurement according to claim 5, wherein said stereoscopic images are previously provided with indexes indicative of relative positions, further comprising a data magnification determining portion for determining the first magnification of said reference data block according to a position of a reference point in the searched image.

7. An apparatus for image measurement according to claim 5, wherein said data setting means is adapted to establish the searched data block movable in said searched area.

8. An apparatus for image measurement according to claim 5, wherein said image measuring portion, in performing the image measurement, corrects the coordinate value of said searched data changed in said magnification changing portion to the coordinate value before the changing.

9. An apparatus for image measurement according to claim 1, wherein said correspondence determining portion is adapted to perform template matching or correlation processing.

10. An apparatus for image measurement according to claim 2, wherein said data setting means is adapted to establish the searched data block movable in said searched area.

11. An apparatus for image measurement according to claim 2, wherein said image measuring portion, in performing the image measurement, corrects the coordinate value of said reference data changed in said magnification changing portion to the coordinate value before the changing.

12. An apparatus for image measurement according to claim 6, wherein said data setting means is adapted to establish the searched data block movable in said searched area.

13. An apparatus for image measurement according to claim 6, wherein said image measuring portion, in performing the image measurement, corrects the coordinate value of said searched data changed in said magnification changing portion to the coordinate value before the changing.

14. An apparatus for image measurement according to claim 5, wherein said correspondence determining portion is adapted to perform template matching or correlation processing.

15. A method for processing an image measurement, wherein a pair of stereoscopic images are taken in different angles, comprising:
   establishing a reference data block having a first magnification in a reference image and a searched data block having a second magnification in a searched image;
   determining correspondence between said reference data block and said searched data block;
   changing the first magnification of image data in said reference data block according to the second magnification of image data in said searched data block when there is a difference between the first and second magnifications whereby the first and second magnifications become virtually equal; and
   performing an image measurement according to said correspondence, wherein said correspondence is determined by using said reference data block, of which the first magnification of image data is changed in said magnification changing portion, and said searched data block.

16. The method according to claim 15, further comprising:
    providing indexes indicative of relative positions of the stereoscopic images; and
    determining the second magnification of said searched data block according to a position of a reference point in the searched image.

17. The method according to claim 15, further comprising:
    correcting a coordinate value of said reference data changed in said magnification changing to a coordinate value before said changing.

18. A method for processing an image measurement, wherein a pair of stereoscopic images are taken in different angles, comprising:
    establishing a reference data block having a first magnification in a reference image and a searched data block having a second magnification in a searched image;
    determining correspondence between said reference data block and said searched data block;
    changing the second magnification of image data in said searched data block according to the first magnification of image data in said reference data block when there is a difference between the first and second magnifications whereby the first and second magnifications become virtually equal; and
    performing an image measurement according to said correspondence, wherein said correspondence is determined by using said reference data block, of which the first magnification of image data is changed in said magnification changing portion.

19. The method according to claim 18, further comprising:
    providing indexes indicative of relative positions of the stereoscopic images; and
    determining the first magnification of said reference data block according to a position of a reference point in the searched image.

20. The method according to claim 18, further comprising:
    correcting a coordinate value of said reference data changed in said magnification changing to a coordinate value before said changing.

* * * * *